United States Patent [19]

Hansen et al.

[11] Patent Number: 5,022,164

[45] Date of Patent: Jun. 11, 1991

[54] FLUID BED DRYER

[75] Inventors: Ove Hansen; C. Douglas Thrasher, both of Columbia, Md.

[73] Assignee: A/S Niro Atomizer, Soeborg, Denmark

[21] Appl. No.: 442,817

[22] Filed: Nov. 29, 1989

[51] Int. Cl.$^5$ .................................................. F26B 17/00
[52] U.S. Cl. .................................. 34/57 B; 34/57 R; 432/58
[58] Field of Search ...................... 34/57 A, 10, 57 B; 432/15, 58

[56] References Cited

U.S. PATENT DOCUMENTS

| | | |
|---|---|---|
| 1,515,965 | 11/1924 | Pardee . |
| 3,401,465 | 9/1968 | Larwill . |
| 3,976,330 | 8/1976 | Babinski et al. . |
| 4,255,072 | 3/1981 | Gappa et al. . |
| 4,323,037 | 4/1982 | Meyer-Kahrweg . |
| 4,352,607 | 10/1982 | Loveless et al. . |
| 4,492,040 | 1/1985 | Jensen et al. ................... 34/57 A X |
| 4,559,719 | 12/1985 | Dodson . |

FOREIGN PATENT DOCUMENTS

2904121 12/1979 Fed. Rep. of Germany .

*Primary Examiner*—Henry A. Bennet
*Attorney, Agent, or Firm*—Armstrong, Nikaido, Marmelstein, Kubovcik & Murray

[57] ABSTRACT

A fluid bed dryer for processing a particulate material includes a series of chambers separated by longitudinally extending common walls and connected by turn-around sections to provide a serpentine path for the material. Each turn-around section is open to adjacent chambers at one end of one of the common walls to receive and turn particulate material distributed across the width of one of the chambers through an arcuate path and deliver the material to the other chamber. Each of the chambers and turn-around sections have a base including a number of gas introduction openings oriented to introduce gas in a specific direction to fluidize and move the particulate material in that direction. The gas introduction openings in the turn-around sections are oriented to successively receive and turn incremental vertical columns of the particulate material in accordance with the distance each incrmental vertical column is spaced from the common wall.

13 Claims, 7 Drawing Sheets

FLUID BED DRYER

The present invention is directed to a fluid bed dryer and, more specifically, to a fluid bed dryer for processing particulate material.

BACKGROUND OF THE INVENTION

Fluidized beds have been used in many applications for the purpose of processing and moving one or more materials and have found application in chemical reactions and physical processes requiring heat transfer, mixing of solids as well as gaseous materials, size enlargement, reduction and classification processes; absorption-desorption, heat treating and coating processes. All solid/gas fluid bed systems include an arrangement for introducing the gas and solid material to the system as well as for causing the solid materials to move through the system in a controlled manner. The operability of a fluid bed system for processing solid materials is critically dependent in many instances on the particle size distribution of the solid material being fluidized. Some materials such as soap products have a very broad particle size distribution and also require gentle handling to avoid fines separation during the drying process. That is, some materials such as those prepared for distribution in the form of granules or flakes of soap products tend to fragment to such an extent as they are being dried in a fluid bed system that they produce an undesirable excess of fine particles which may require at least a partial shut-down of the system operation. This problem may be avoided by operating the system under gentle conditions using less gaseous pressure but then heavy particles begin to accumulate on the gaseous fluid distribution plate producing a system malfunction.

An important element in fluid bed systems is the base or bottom plate which is provided with a number of relatively small openings arrayed in a pattern across the width of the plate through which a gaseous medium under pressure is passed for fluidization of a material to be processed in the system. The gas flow openings are generally designed to minimize back flow of the solid material being processed and to distribute the fluidizing gas evenly. One such bottom plate known in the manufacture of fluidized beds as a "GILL PLATE", bottom plate and manufactured by Niro Atomizer of Soborg, Denmark, is so constituted that the gas passing through the bottom plate not only provides a gaseous force for fluidization but also provides a force to cause movement of the material in a desired direction along the bottom plate. The "gill" type bottom plates are constructed having the "gills" distributed in a rectangular pattern with each "gill" providing orifice openings for gas flow as may be required to satisfy fluidization and material transport requirements for specific materials.

Figure 6:
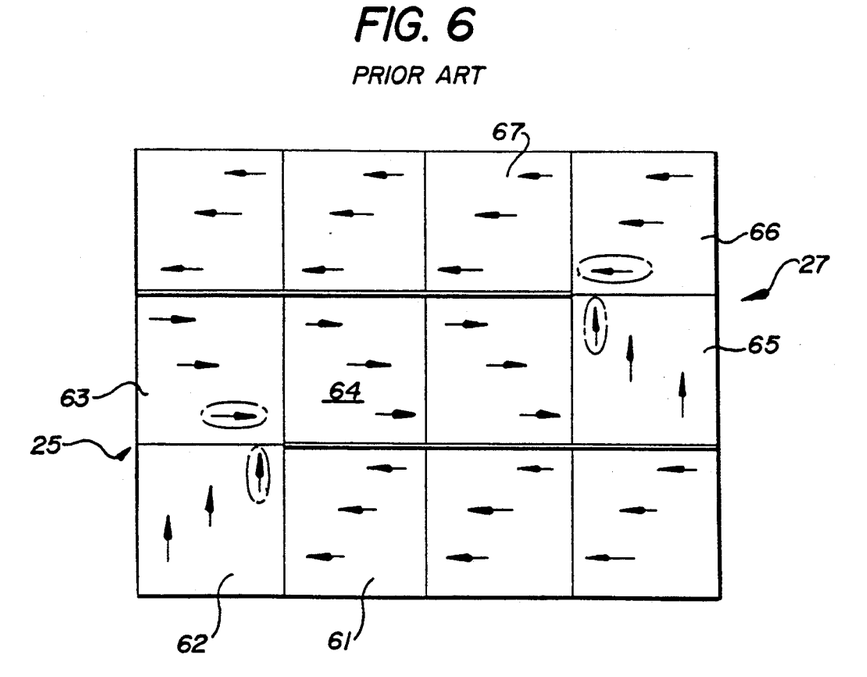
FIG. 6 is a schematic plan view showing a conventional array of bottom plates in the fluid bed dryer of FIG. 1.

Fluid beds used for drying thermally sensitive materials are generally of the plug flow type operated at relatively low temperatures and requiring relatively long material residence times in the equipment to satisfactorily dry the material. Such dryers are usually provided in a folded design providing a serpentine flow path for the material whereby economies of space, gas ducting and thermal energy can be obtained. In a folded or serpentine flow path dryer design the material being processed loops back and forth as it passes through the equipment. Although this design minimizes the space and distances required in operating the equipment, in folded fluid bed dryers using a conventional bottom plate design as shown in FIG. 6, there is a tendency for some materials being processed to stop fluidizing and pile up at the turn around sections between the adjacent chambers thereby requiring the process to be shut down due to malfunction of the equipment. That is, conventional plug flow fluid beds are fitted with bottom plates rectilinear in form and are placed with no particular consideration as to the energy required to maintain the desired fluidization and directional transport of the material being processed in the turn around sections of a folded, plug flow fluid bed.

This invention teaches an improved fluid bed dryer design and more specifically, an improved fluid bed base or bottom plate design wherein each incremental volume of the material being processed adjacent an incremental area of the gas distribution bottom plate is provided with that energy required to maintain the bed in a fluid condition and to transport the material adjacent the plate in a specific desired direction away from that incremental area of the plate and to an area from which additional material is being removed in a specific direction with a minimum loss of fines.

The object of the present invention is to provide an improved fluid bed dryer particularly suited for drying a readily decrepitateable, feed material of broad particle size distribution which is capable of sustained operation without process interruption because of fluidization or material transport failure while continuously producing a product having a minimum of fines.

The object of this invention is attained by providing a bottom plate design which provides continuous process operation and avoids the accumulation of heavy particles in the turn around sections using a minimum of gas flow energy for fluidization and material transport. The present invention avoids the formation and blow off of an undesirable quantity of fine particles by avoiding the use of energy in excess of that required for fluidization and material transport.

A further object of this invention is to provide an improved bottom plate design particularly suited for use in equipment used for pre-drying feed materials prior to final drying.

The improved bottom plate design specifically orients the bottom plate gas flow openings so as to cause the material immediately adjacent the bottom plate to be moved in nominal parallel flow from one area to another with no material accumulation at any area.

SUMMARY OF THE INVENTION

A fluid bed dryer for processing a particulate material includes a housing providing a series of chambers with adjacent chambers separated by a longitudinally extending common wall and connected by a turn-around section to provide a serpentine path leading from an entrance end of a first chamber to an exit end of a last chamber. Each turn-around section is open at one end of one of the common walls to the adjacent chambers separated by the common wall and serves to receive and turn particulate material distributed across the width of one of the chambers through an arcuate path of 180° and deliver the material to the other chamber. Each of the chambers and turn-around sections have a base including at least one bottom plate with a number of gas introduction openings distributed across each plate and oriented to introduce gas into said chamber in a specific direction to fluidize and move a particulate material in that direction. The gas introduction openings in each of the chambers are oriented to uniformly fluidize and move the particulate material in a direction parallel to the common wall and the gas introduction openings in each turn-around section are oriented to successively receive and turn incremental vertical columns of the particulate material with each incremental vertical column of the particulate material received and turned successively in accordance with the distance each incremental vertical column is spaced from the common wall. A plenum chamber provides pressurized gas beneath each bottom plate and a source of pressurized gas is connected to each plenum chamber.

In a preferred embodiment, the base of each chamber is provided with at least one plate having lateral edges parallel to the common wall and an end edge at the one end of each chamber open to a turn-around section and the base of the turn-around section includes at least three bottom plates having a pair of edges that intersect at an angle and the three bottom plates are inset with the intersecting edges of each bottom plate abutting one of the intersecting edges of an adjacent bottom plate or one of the end edges of the bottom plates of the chambers.

In a further embodiment, the base of each chamber is comprised of at least one bottom plate having lateral edges parallel to the common wall and spaced end edges and an edge of one plate of the base of at least one chamber open to a turn-around section extends from the end of the common wall at an oblique angle relative to the common wall and traverses a portion of the turn-around section and the bottom of said turn-around section includes at least one bottom plate having a pair of edges that intersect at an angle and the turn-around section bottom plate is inset with the pair of intersecting edges abutting the end edges of the bottom plates of the chambers.

In a still further preferred embodiment, the base of each of the chambers extends into a connecting turn-around section and terminates in an edge that extends from the one end of the common wall at an oblique angle relative to the common wall, and a bottom plate having a pair of edges that intersect at an angle and a plurality of gas introduction openings oriented to fluidize and move the particulate material in a direction substantially perpendicular to the direction of movement of the particulate material in said chambers, is inset with the pair of intersecting edges abutting the edges of the base of each chamber in the connecting turn-around section. In this embodiment vertical columns of the particulate material delivered from one of the chambers to the turn-around section are successively and incrementally turned after each vertical column transverses each of the intersecting edges of the bottom plate.

In a still further preferred embodiment, in a non-plug flow pre-drying chamber adjacent a plug flow fluid bed dryer and having a common wall one end of which is open to the entrance end of the first chamber of the fluid bed dryer, the base of the pre-drying chamber extends into a connecting turn around section without termination comprising a bottom plate having a pair of edges one of which intersects the bottom plate of the non-plug flow dryer at the common wall and the other of which intersects the bottom plate of the plug flow dryer at the common wall.

The present invention and the advantages provided thereby will be more fully understood with reference to the following Detailed Description of the Preferred Embodiment taken in conjunction with the accompanying drawings.

DESCRIPTION OF THE PREFERRED EMBODIMENT

Figure 1:
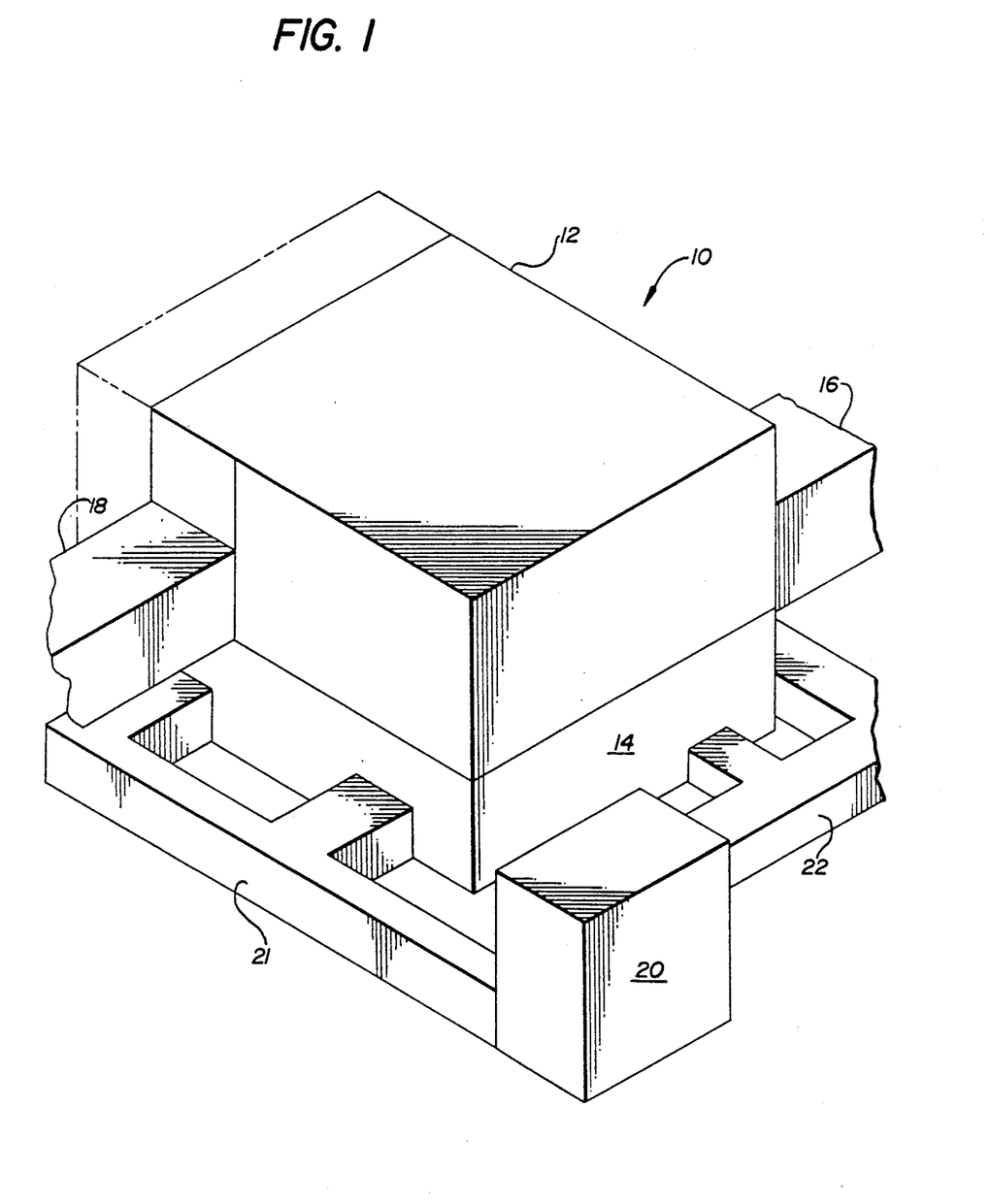
FIG. 1 is a perspective view of a fluid bed dryer.
Figure 2:
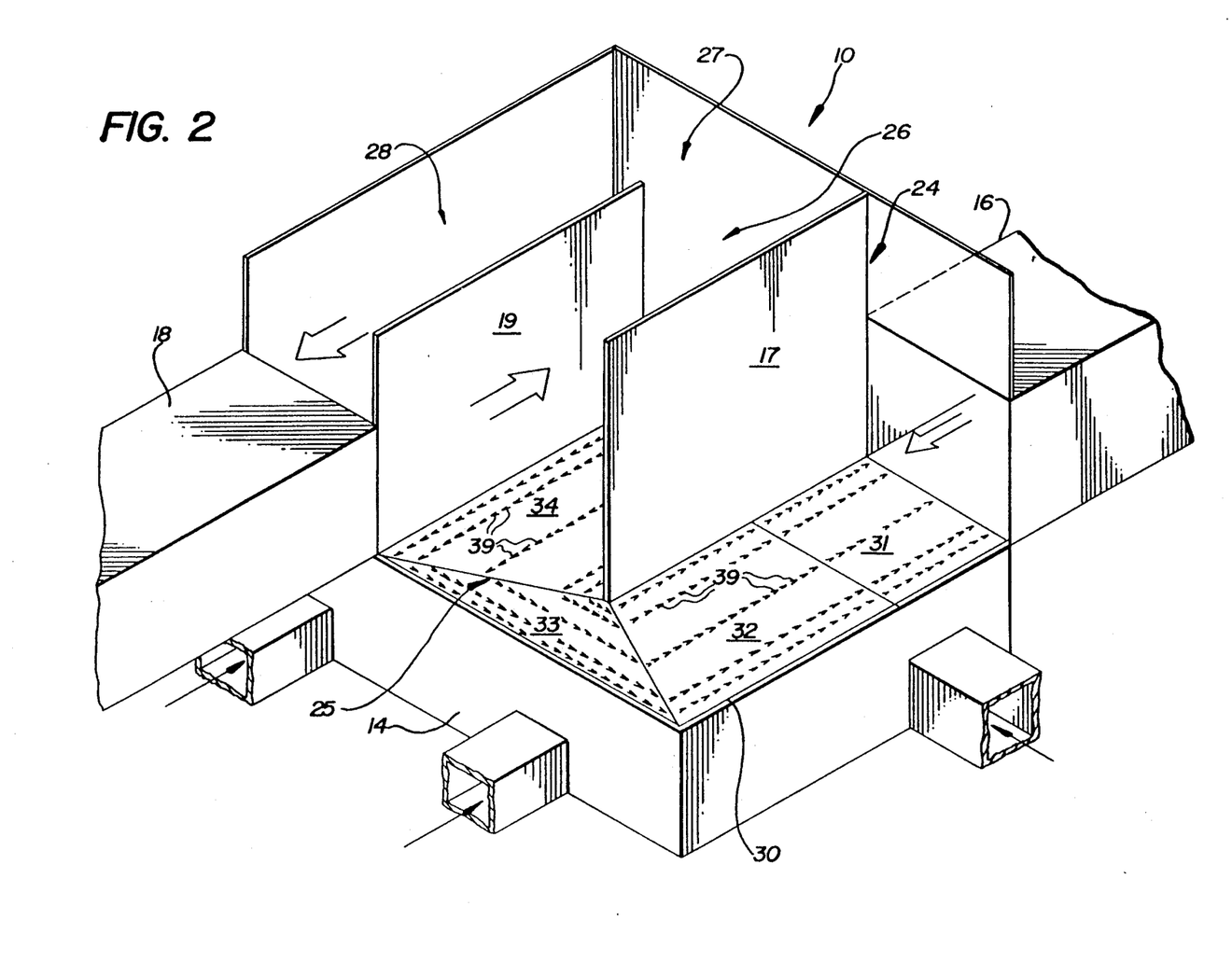
FIG. 2 is a partial perspective view of the fluid bed dryer of FIG. 1, according to this invention, with portions of the housing removed.

With reference to the drawings wherein like reference numerals designate the same or like parts throughout, there is shown in FIGS. 1 and 2 a fluid bed dryer according to this invention generally designated by the reference numeral 10 and comprised of an upper housing 12 and a lower housing 14. A feed material inlet 16 and a material outlet 18 are provided on opposite sides of the upper housing 12. A compressor 20 provides a source of pressurized gas which is distributed by means of conduits 21 and 22 to plenum chambers located in the lower dryer housing 14.

FIG. 2 shows the fluid bed dryer of FIG. 1 with external panels of the upper housing 12 and portions of the pressurized gas conduits removed to better illustrate the interior of the apparatus. As shown by FIG. 2, the interior of the fluid bed dryer is separated by means of two longitudinally extending walls 17 and 19 into a series of chambers 24, 26 and 28. The wall 17 is common to the chambers 24 and 28 which are connected at one end of the wall 17 by means of a turn-around section 25. In a similar manner, the wall 19 is common to the chambers 26 and 28 which are connected at one end of the wall by a turn-around section 27. Each of the chambers and turn-around sections provide a base 30 for the interior of the fluid bed dryer which is comprised of a plurality of bottom plates such as the plates 31–34.

Each of the bottom plates 31–34, etc., are provided with a plurality of gas introduction openings 39 which are uniformly distributed across the width and along the length of each bottom plate and serve to introduce the pressurized gas from the plenum chambers located in the lower dryer housing 14 in a uniform and controlled manner to each of the chambers and turn-around sections to both fluidize and provide directional movement to a particulate material provided to the fluid bed dryer.

Figure 3:
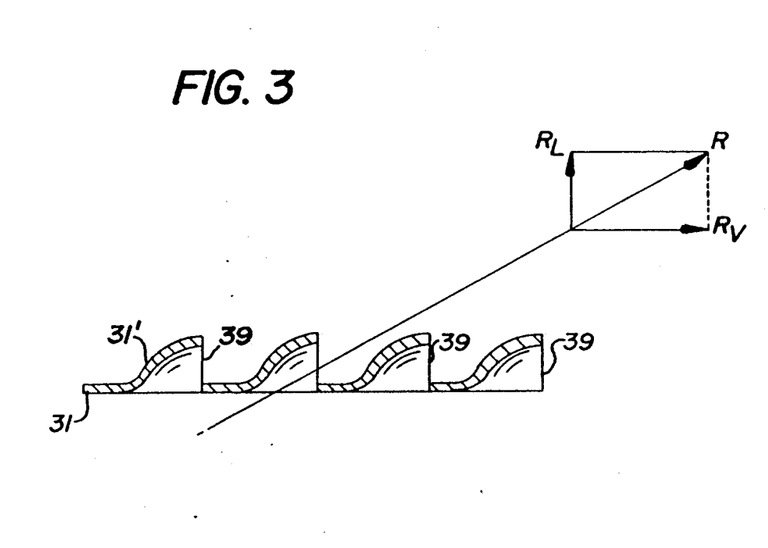
FIG. 3 is a partial sectional view of a bottom plate.

The gas introduction openings may be provided in the base plates as shown by FIG. 3 wherein a base plate 31 has been stamped or pressed to displace portions 31' from the plane of the base plate to provide a plurality of unidirectionally oriented orifices 39. As schematically illustrated by the vector arrow R in FIG. 3, the pressurized gas moving through the orifices 39 have both a lifting component $R_L$ and a directional component $R_v$ which together provide a lifting component to fluidize the material and a directional component to move the material subject to the gaseous flow exiting through the orifice 39.

Figure 4:
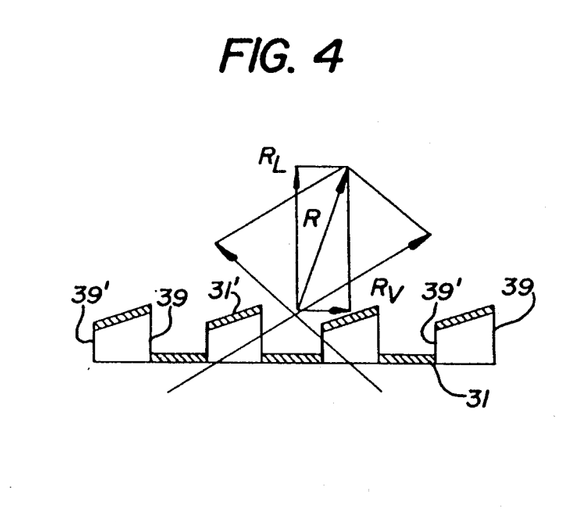
FIG. 4 is a partial sectional view of another type of bottom plate.

FIG. 4 shows a base plate 31 having an alternate structure for providing gas introduction openings in a base plate 31. In FIG. 4, the base plate 31 is stamped or pressed to totally displace portions 31' from the primary plane of the base plate 31 and thus provide a primary orifice 39 and a secondary orifice 39' opened at each end of the displaced portion 31' of the base plate. As shown schematically in FIG. 4, the pressurized gas exiting from adjacent orifices 39 and 39' acts on particulate material that may be located therebetween to provide a lifting and fluidizing component $R_L$ together with a directional movement or velocity component $R_v$ wherein the lifting component $R_L$ is greater than the directional velocity component $R_v$.

Figure 5:
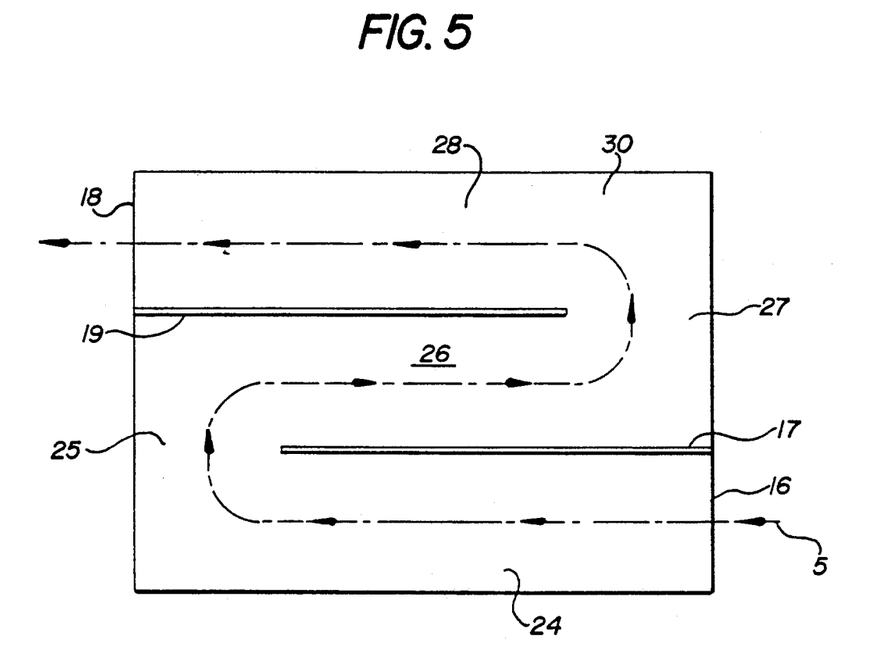
FIG. 5 is a schematic plan view showing the desired material flow path through the dryer of FIG. 1.

As schematically illustrated by FIG. 5, the arrangement of the fluid bed bottom plates together with the partition walls 17 and 19 internally of the fluid bed dryer provides lifting and directional movement to a particulate material introduced through the inlet 16 in a serpentine path as represented by the arrow S through the chamber 24, turn-around section 25, chamber 26, turn-around section 27, and chamber 28 to the material outlet 18 while effecting some desired process such as for example drying the particulate material as it traverses the serpentine path from the inlet 16 to the outlet 18.

A conventional arrangement of base plates and gas introduction openings for moving a particulate material through a dryer such as the fluid bed dryer 10 is shown by FIG. 6. In FIG. 6, the bottom plates 61-67, etc., are each provided with a plurality of gas introduction openings which induce directional movement of a particulate material in a direction normal to an edge of each plate. Although such an arrangement is satisfactory for moving certain types of materials in a fluid bed dryer, as will be described more fully below, the arrangement has not functioned satisfactorily to move a particulate material having a broad particle size distribution which also requires gentle handling to avoid fines separation. One of the problems encountered with the conventional bottom plate arrangement as shown by FIG. 6 is that such a material could not be satisfactorily moved through the turning sections 25 and 27 because the material tended to deposit in piles in the areas circled in bottom plates 62, 63, 65 and 66 when the dryer was operated with a gas pressure adequate to support the material without creating an unacceptable separation of fines from the material.

The present invention avoids that problem by providing a substantial improvement in the manner in which the bottom plates and the gas introduction openings are provided particularly in the turn-around sections of the fluid bed dryer.

Figure 7:
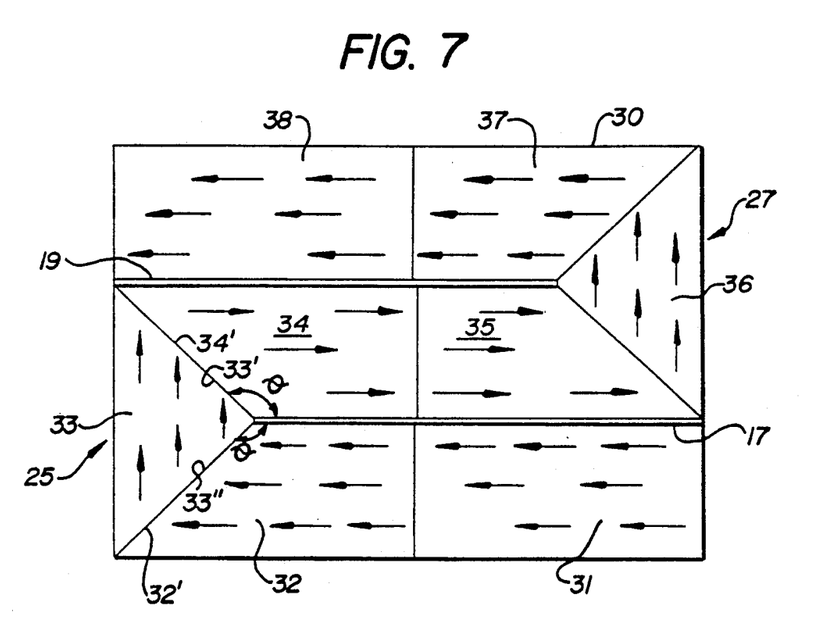
FIG. 7 is a schematic plan view showing a bottom plate design according to the present invention.

In accordance with a preferred embodiment of the present invention as shown by FIGS. 2 and 7 of the drawings, the base of the turn-around sections 25 and 27 is comprised of a separate triangularly shaped base plate 33 or 36 together with angular extensions of the bottom plates 32 and 34 or 35 and 37 of the chambers which open into each of the turn-around sections 25 and 27. The bottom plate structure is quite similar in both of the turn-around sections 25 and 27 and therefore, the base of the turn-around section 25 will be described in detail with the understanding that the base of the turn-around section 27 is substantially the same.

As shown by FIG. 2, the turn-around section 25 is open at one end of the wall 17 to the adjacent chambers 24 and 26. The gas introduction openings 39 in the bottom plates 31 and 32 of the chamber 24 are oriented to move a particulate material in a direction parallel to the wall 17 and the openings in the bottom plates 34 and 35 of the chamber 26 are likewise oriented to move the particulate material parallel to the common wall 17 but in an opposite direction. The gas introduction openings 39 in the turn-around section beyond the end of the common wall 17 are, as diagrammatically illustrated by FIG. 11, oriented to move each incremental vertical column $c_1$, $c_2$, etc., of particulate material from the chamber 24 into the turn-around section 25 and then successively turn each incremental vertical column in accordance with the distance each incremental vertical column is spaced from the common wall 17.

In the embodiment as shown by FIG. 7, this is accomplished by forming the bottom plates 32 and 34 respectively with an edge 32' and 34' which extends from the end of the common wall 17 at an oblique angle $\Theta$ relative to the common wall and providing the bottom plate 33 with two edges 33' and 33" that intersect at an angle and by insetting the bottom plate 33 with the edges 33' and 33" abutting the edges 34' and 32'. The edges 34' and 32' converge toward the end of the common wall 17 at an included angle less than 180°, actually at an angle of 90° in this embodiment since $\Theta$ is equal to 135°. Thus, as diagrammatically shown by FIG. 11, each incremental vertical column $c_1$, $c_2$, etc., of the particulate material is moved by the gas introduction openings 39 of the base plate 32 from the chamber 24 into the turn-around section 25 with adjacent incremental vertical columns of the particulate material being successively turned by the gas introduction openings in the bottom plate 33 in accordance with the distance that column is spaced from the wall 17 as the column crosses the abutting edges 32' and 33'. The particulate material is then moved by the gas introduction openings in the bottom plate 33 through the turn-around section 25 until each vertical column traverses the abutting edges 33' and 34' where each column is again successively turned in accordance with its distance from the common wall 17 through an angle of 90° and moved from the turn-around section 25 into the chamber 26 by the gas introduction openings 39 in the bottom plate 34.

Figure 11:
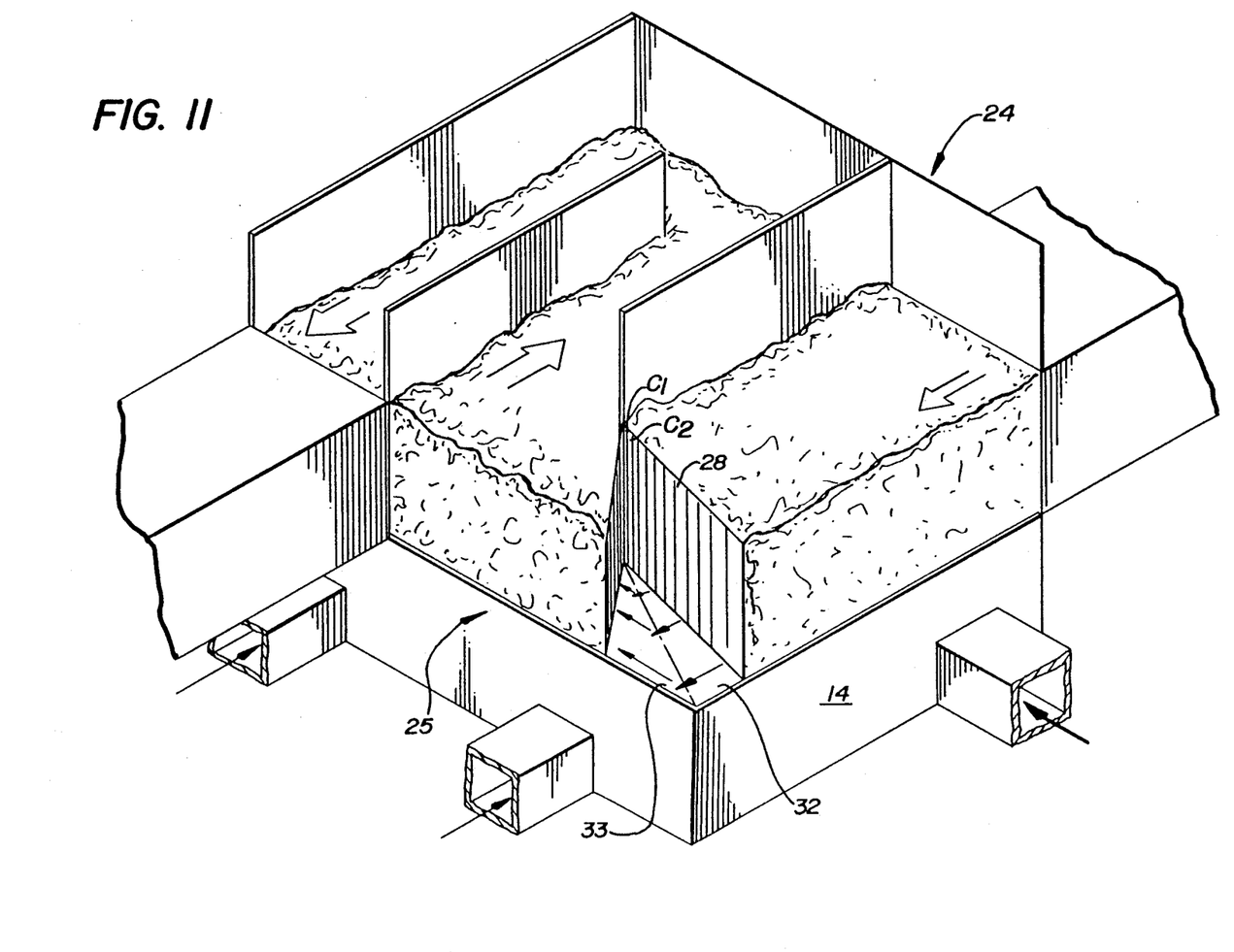
FIG. 11 is view similar to FIG. 2 and diagrammatically illustrating the operation of a fluid bed dryer having a bottom plate design according to the present invention.

In the embodiment shown by FIGS. 2, 7 and 11 of the drawings, the particulate material can thus be moved into and turned twice through two angles of 90° in the turn-around section and then delivered to the adjacent chamber 26.

Figure 8:
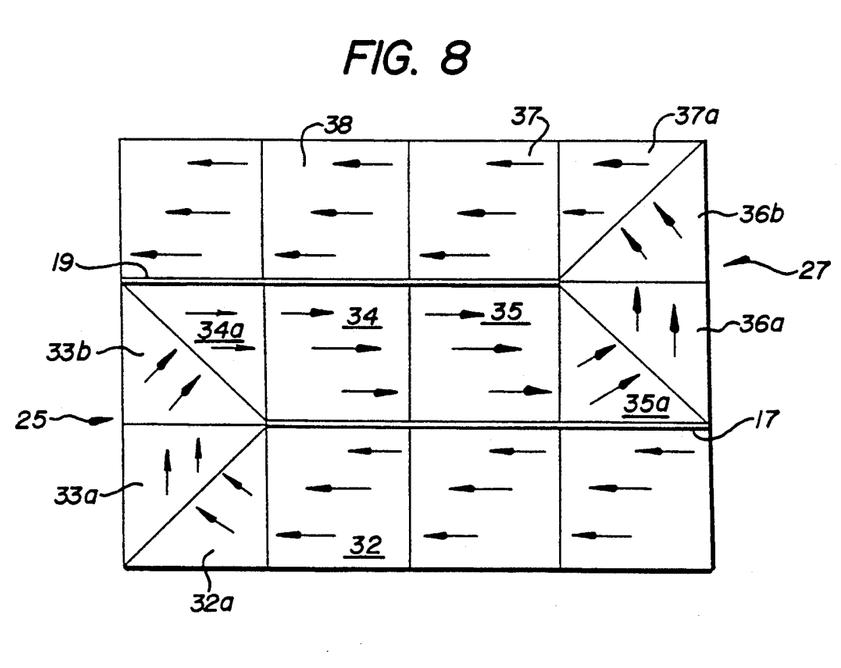
FIG. 8 is a schematic plan view showing an alternate bottom plate design according to the present invention.

An alternate arrangement of the bottom plates of the turn-around section in accordance with the present invention is shown by FIG. 8. In FIG. 8, the base of the turn-around section 25 is provided in the form of four separate bottom plates 32a, 33a, 33b and 34a which successively receive the particulate material from chamber 24 and successively turn incremental vertical columns of the material through four turns of 45° each to deliver the material for movement parallel to the walls 17 and 19 in chamber 26. The base of the turn-around section 27 is similarly configured with four bottom plates 35a, 36a, 36b and 37a.

Figure 9:
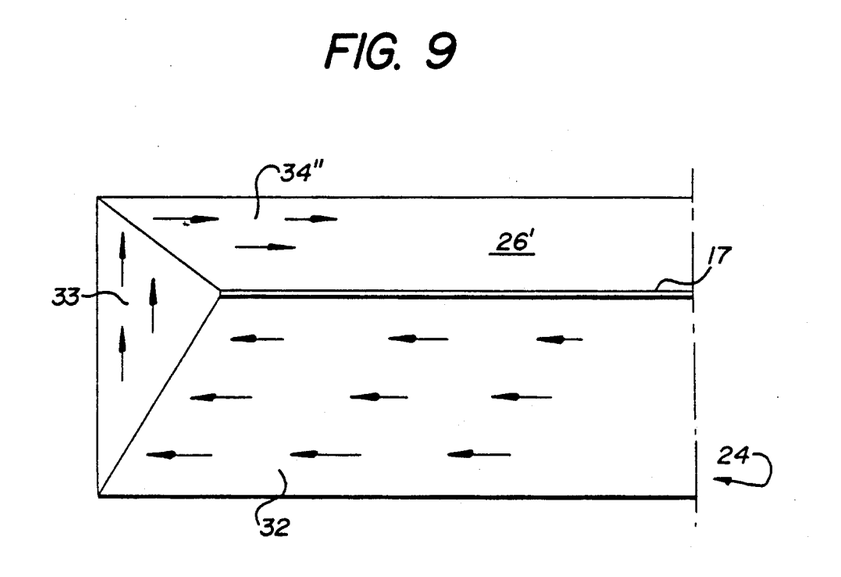
FIG. 9 is a schematic plan view showing a still further bottom plate design in accordance with the present invention.

FIG. 9 illustrates a still further embodiment of the present invention wherein a particulate material is delivered to a first chamber 24, turned in a turn-around section and delivered to an adjacent chamber 26' of substantially less width than the chamber 24. In this embodiment, as in the embodiment of FIG. 7, the bottom plates 32 and 34' are each formed with an edge that extends from the common wall 17 at an oblique angle relative to the common wall and the bottom plate 33 is formed with a pair of intersecting edges and the bottom plate 33 is inset in the base of the turn-around section with the intersecting edges abutting the edges of the bottom plates 32 and 34''.

Figure 10:
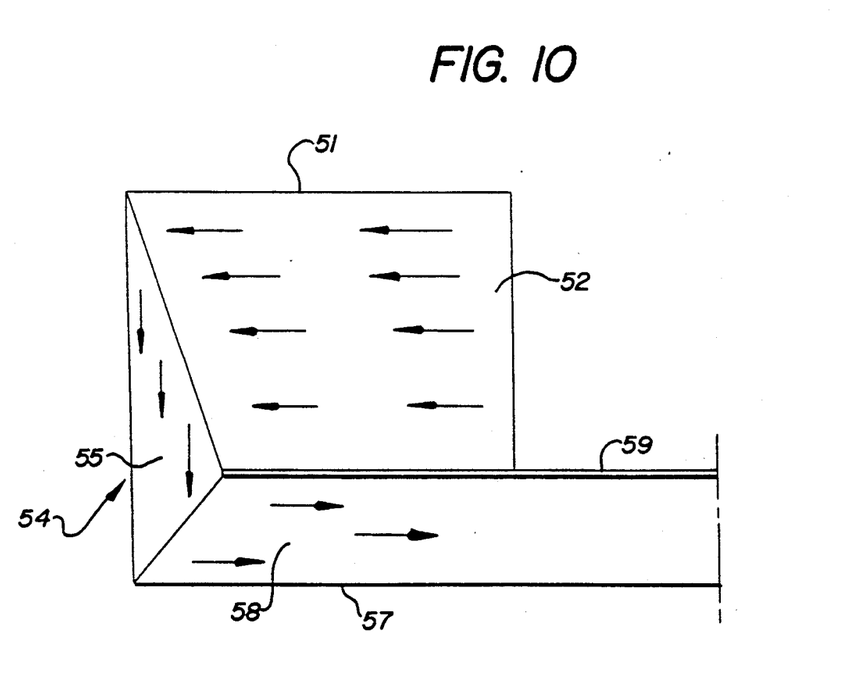
FIG. 10 is a schematic plan view showing another bottom plate design in accordance with the present invention.

In FIG. 10, a still further embodiment of the invention is illustrated wherein an outlet chamber 51 of a fluid bed pre-dryer is connected to an inlet chamber 57 of a fluid bed dryer by means of a turn-around section 54 having a bottom plate 55. In a non-plug flow pre-dryer, a major fraction of liquid present in a material is vaporized before the material is introduced to a plug flow fluid bed dryer and the turn-around section 54 as shown by FIG. 10 permits the continuous introduction of pre-dried particulate material from the pre-dryer outlet chamber 51 to the fluid bed dryer inlet chamber 57. The bottom plates 52 and 58 are each provided with an edge that extends from the open end of a common wall 59 at an oblique angle relative to the common wall and the bottom plate 55 is formed with a pair of edges that intersect at an angle. The bottom plate 55 is inset in the base of the turn-around section with the intersecting edges abutting the edges of the bottom plates 52 and 58.

The advantages offered by the present invention will be readily appreciated after consideration of the following comparative examples.

EXAMPLE 1

A fluid bed dryer similar to that shown by FIG. 1 and having a conventional bottom plate base arrangement as illustrated by FIG. 6 was placed in operation to dry and remove water from a particulate material in the form of a soap product having a broad particle size distribution. The material feed rate was 45,000 pounds solids per hour. The air flow rate to each zone was 40,000 pounds per hour which produced a differential pressure across the gas distribution bottom plates of three inches of water. The feed material filled the dryer rapidly and, both fluidization and movement of the material at first seemed satisfactory. However, after approximately one hour of operation, it was noted that the fines handling system was being overloaded and it was observed that considerable dust was being generated in the first chamber. Following tactful inspection of the base in the area of the first chamber and turn-around section, it was found that mounds of large sized heavy material had accumulated in and around the turn-around sections in the locations indicated by the ellipse enclosed arrows as shown in FIG. 6 which blocked material transport along the base and stopped fluidization of material directly over the blocked area. Operation of the fluid bed dryer was then terminated.

EXAMPLE 2

A second attempt to operate the same unit was made keeping the solids feed rate at 45,000 pounds per hour and reducing feed to 25,000 pounds of air per hour per zone. Fluidization was sluggish and not observed in many areas of the base at this relatively low rate of air flow and this attempt at operating the fluid bed dryer was terminated after about 30 minutes due to lack of acceptable fluidization of the material.

EXAMPLE 3

A third attempt to operate the same fluid bed dryer was made using 50,000 pounds per hour of air per zone and 45,000 pounds per hour of feed solids. Fluidization was achieved throughout the dryer but fluidization was quite violent. There was also indication that the fluidized bulk density in the first chamber was reduced. There was no evidence of deposits on the base or bottom plates. However, the additional air flow increased the fines to such an extent that the fines collection system was again overloaded and the operation was terminated.

In view of the foregoing examples, it was concluded that a fluid bed dryer having a conventional bottom plate arrangement as shown by FIG. 6 was not capable of handling a soap product having a broad particle size distribution as attempted in the foregoing examples because the air flow necessary to provide fluidization of the particulate material fragmented the material to such an extent that it overloaded the fines system and when the air flow was reduced to avoid the excessive fines problem, there was insufficient air pressure to provide fluidization and movement of such a material in the turn-around section of the fluid bed dryer.

EXAMPLE 4

The base of the fluid bed dryer utilized in Examples 1-3 was modified to an arrangement such as that shown by FIG. 7. The modified fluid bed dryer was then placed in operation with a material feed rate of 45,000 pounds solids per hour and an air flow rate to each zone at 30,000 pounds per hour. The differential pressure across the base or bottom plates was 1.7 inches of water. Under these moderate conditions, it was found that fluidization of the soap product material was uniform at all points throughout the fluidized bed including the turn-around sections. A comparison of the particle size distribution of the feed material with the particle size distribution of the dried product indicated that there was not significant decrepitation of the material as it was being dried. Further, the amount of material entering the fines handling system indicated that there was little fines separation from the main fluidized bed of material during the drying process. The vast improvement provided by the modified bottom plate structure as shown by FIG. 7, particularly in the turn-around sections 25 and 27 was clearly established by operation of the fluid bed dyer as described in Example 4.

Although the present invention has been disclosed and described with reference to specific embodiments as shown by the drawings, the present invention is not to be construed as limited to the particular form of those embodiments. The foregoing description is to be regarded as illustrative rather than restrictive and it should be understood that modifications and variations in the details of the fluid bed dryer base and bottom plates disclosed herein may be made without departing from the spirit and scope of the invention as defined by the claims appended hereto.

What is claimed is:

1. A fluid bed dryer for processing a particulate material comprising:
   a housing providing a series of chambers with adjacent ones of said chambers separated by a longitudinally extending common wall and connected by a turn-around section to provide a serpentine path leading from an entrance end of a first one of said chambers to an exit end of a last one of said series of chambers,
   each turn-around section being open at one end of one of said common walls to the adjacent chambers separated by said common wall and serving to receive and turn particulate material distributed across the width of one of said chambers through an arcuate path of 180° and deliver said material to the other said chamber,
   each of said chambers and turn-around sections having a base including at least one bottom plate with a plurality of gas introduction openings distributed across each plate and oriented to introduce gas into said chamber in a specific direction to fluidize and move a particulate material in said direction,
   said gas introduction openings in each of said chambers being oriented to uniformly fluidize and move said particulate material in a direction parallel to said common wall and said gas introduction openings in each turn-around section being oriented to successively receive and turn incremental vertical columns of said particulate material with each incremental vertical column of said particulate material received and turned successively in accordance with the distance each incremental vertical column is spaced from said common wall,
   a plenum chamber for providing pressurized gas beneath each bottom plate, and
   a source of pressurized gas connected to each said plenum chamber.

2. A fluid bed dryer as defined by claim 1, wherein the base of each of said chambers is comprised of at least one plate having lateral edges parallel to said common wall and an end edge at said one end of each chamber open to a turn-around section and the base of said turn-around section includes at least three bottom plates having a pair of edges that intersect at an angle and said at least three bottom plates are inset with each of said intersecting edges of each bottom plate abutting an edge of an adjacent plate at the base of said turn-around section and said chambers.

3. The fluid bed dryer as defined by claim 2, wherein the sum of the angles defined by the intersecting edges of said at least three bottom plates is 180°.

4. The fluid bed dryer as defined by claim 2, wherein the angles defined by the intersecting edges of two of said at least three bottom plates are less than 90°.

5. The fluid bed dryer as defined by claim 2, wherein the angles defined by the intersecting edges of said at least three bottom plates are substantially equal.

6. A fluid bed dryer as defined by claim 1, wherein the base of each of said chambers is comprised of at least one bottom plate having lateral edges parallel to said common wall and spaced end edges and an end edge of said at least one plate of the base of at least one chamber at said one end of said chamber open to a turn-around section extends from said one end of said common wall at an oblique angle relative to said common wall and traverses a portion of said turn-around section and the bottom of said turn-around section includes at least one bottom plate having a pair of edges that intersect at an angle and said at least one turn-around section bottom plate is inset with said pair of intersecting edges abutting said end edges of the bottom plates of said chambers.

7. A fluid bed dryer as defined by claim 6, wherein said turn-around section includes a plurality of bottom plates with each bottom plate having a pair of edges that intersect at an angle no greater than 90° and said plurality of bottom plates are inset with their intersecting edges abutting an intersecting edge of another bottom plate or one of said end edges of the bottom plates of said chambers.

8. A fluid bed dryer as defined by claim 6, wherein an end edge of said at least one bottom plate of each chamber open to said turn-around section extends from said one end of said common wall at an oblique angle relative to said common wall and said turn-around section includes a bottom plate having a pair of intersecting edges and said turn-around section bottom plate is inset with said pair of intersecting edges abutting said end edges of the bottom plates of said chambers.

9. A fluid bed dryer as defined by claim 6, wherein said end edges of said at least one bottom plate of each chamber open to a turn-around section converge toward said one end of said common wall at an included angle less than 180°.

10. A fluid bed dryer for processing a particulate material having a broad particle size distribution comprising:
   a housing providing a series of chambers with adjacent ones of said chambers separated by a longitudinally extending common wall and connected by a turn-around section to provide a serpentine path leading from an entrance end of a first one of said chambers to an exit end of a last one of said series of chamber,
   each turn-around section being open at one end of one of said common walls to the adjacent chambers separated by said common wall and serving to receive and turn particulate material distributed across the width of one of said chambers through an arcuate path of 180° and deliver said material to said other chamber,
   each of said chambers and turn-around sections having a base including at least one bottom plate with a plurality of gas introduction openings distributed across each plate and oriented to introduce gas into said chamber in a specific direction to fluidize and move a particulate material in said direction,
   said gas introduction openings in the base of each of said chambers being oriented to uniformly fluidize and move said particulate material in a direction parallel to said common wall with the direction of movement in one of said chambers being opposite to the direction of movement in an adjacent chamber,
   the base of each of said adjacent ones of said chambers extending into said connecting turn-around section and terminating in an edge that extends from said one end of said common wall at an oblique angle relative to said common wall,
   a turn-around section bottom plate having a pair of edges that intersect at an angle and a plurality of gas introduction openings oriented to fluidize and move said particulate material in a direction substantially perpendicular to the direction of movement of said particulate material in said chambers, said turn-around section bottom plate being inset with said pair of intersecting edges abutting said edges of the base of each of said adjacent chambers in said connecting turn-around section, a plenum chamber for providing pressurized gas beneath each bottom plate, and a source of pressurized gas connected to each said plenum chamber, whereby vertical columns of said particulate material delivered from one of said chambers to said turn-around section are successively and incrementally turned after each vertical column transverses each of said intersecting edges of said bottom plate.

11. The fluid bed dryer defined by claim 10, wherein the edges of the base of each of said adjacent chambers define an included angle of 90° in said connecting turn-around section.

12. The fluid bed dryer defined by claim 10, wherein said pair of edges of said bottom plate intersect at an angle of 90° and said vertical columns of particulate material are substantially turned through an angle of about 90° after each vertical column of particulate material traverses each of said intersecting edges of said bottom plate.

13. Apparatus for drying a particulate material having a broad particle size distribution comprising:

a fluid bed pre-dryer and a fluid bed dryer, said pre-dryer and said dryer each having a chamber separated by a longitudinally extending common wall and connected by a turn-around section to receive and turn particulate material distributed across a width of said pre-dryer chamber through an arcuate path of 180° and deliver said material to the dryer chamber, each of said chambers and said turn-around section having a base including at least one bottom plate with a plurality of gas introduction openings distributed across each plate and oriented to introduce gas into said apparatus in a specific direction to fluidize and move said particulate material in said direction, said gas introduction openings in the base of each of said chambers being oriented to uniformly fluidize and move said particulate material in a direction parallel to said common wall with the direction of movement of said material in said dryer chamber being opposite to the direction of movement in said pre-dryer chamber, a base bottom plate of each of said chambers extending into said turn-around section and terminating in an edge that extends from an end of said common wall at an oblique angle relative to said common wall, a turn-around section bottom plate having a pair of edges that intersect at an angle and a plurality of gas introduction openings oriented to fluidize and move said particulate material in a direction substantially perpendicular to the direction of movement of said particulate material in said chambers, said turn-around section bottom plate being inset with said pair of intersecting edges abutting said edges of said base bottom plates in said turn-around section, a plenum chamber for providing pressurized gas beneath each base, and a source of pressurized gas connected to each plenum chamber, whereby incremental vertical columns of said particulate material received from said pre-dryer chamber are successively received and turned as each vertical column traverses each of said intersecting edges of said turn-around section bottom plate.

* * * * *